US012263547B2

(12) United States Patent
Srikanth et al.

(10) Patent No.: US 12,263,547 B2
(45) Date of Patent: Apr. 1, 2025

(54) COMPUTERIZED DEMANUFACTURING SYSTEM

(71) Applicant: Microsoft Technology Licensing, LLC, Redmond, WA (US)

(72) Inventors: Ranganathan Srikanth, Redmond, WA (US); Gregory Lee Weber, Sammamish, WA (US); Michael Warren Ellis, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/337,229

(22) Filed: Jun. 19, 2023

(65) Prior Publication Data
US 2024/0391038 A1 Nov. 28, 2024

Related U.S. Application Data

(60) Provisional application No. 63/503,661, filed on May 22, 2023.

(51) Int. Cl.
*B23P 19/04* (2006.01)
*B25J 9/00* (2006.01)
(Continued)

(52) U.S. Cl.
CPC ............. *B23P 19/04* (2013.01); *B25J 9/0084* (2013.01); *B25J 11/005* (2013.01); *G05B 15/02* (2013.01)

(58) Field of Classification Search
CPC ......... Y10T 29/49819; Y10T 29/53274; B23P 19/04; H05K 15/0006; H05K 2203/178
See application file for complete search history.

(56) References Cited

U.S. PATENT DOCUMENTS 5,299,693 A * 4/1994 Ubaldi ................. B07C 5/3412
209/3.3
5,560,100 A * 10/1996 Englert .................... H05K 3/30
29/712
(Continued)

FOREIGN PATENT DOCUMENTS

WO 2015168357 A1 11/2015
WO 2023078884 A1 5/2023

OTHER PUBLICATIONS

"Building Resilient Supply Chains, Revitalizing American Manufacturing, And Fostering Broad-Based Growth", In the Report of White House, Jun. 2021, 250 Pages.
(Continued)

*Primary Examiner* — Jason L Vaughan
(74) *Attorney, Agent, or Firm* — Alleman Hall & Tuttle LLP

(57) ABSTRACT

A method for automated device disassembly includes, at a computerized demanufacturing system, receiving a target electronic device for disassembly. Using a set of one or more sensors of the computerized demanufacturing system, a set of sensor data is collected that quantifies one or more physical properties of the target electronic device. Based at least in part on the set of sensor data, correspondences are identified between one or more effectors of the computerized demanufacturing system and one or more interactable elements of the target electronic device. The interactable elements are automatically manipulated using the one or more effectors to at least partially disassemble the target electronic device.

20 Claims, 8 Drawing Sheets

(51) Int. Cl.
*B25J 11/00* (2006.01)
*G05B 15/02* (2006.01)

(56) References Cited

U.S. PATENT DOCUMENTS

| | | | | |
|---|---|---|---|---|
| 5,715,592 | A * | 2/1998 | Mori | H05K 13/0486 228/264 |
| 6,157,902 | A * | 12/2000 | Hirata | G05B 19/4069 700/95 |
| 9,050,719 | B2 * | 6/2015 | Valpola | B25J 13/085 |
| 10,464,105 | B2 * | 11/2019 | Koistinen | B65F 1/1484 |
| 10,825,082 | B2 * | 11/2020 | Librizzi | G06Q 30/0283 |
| 11,045,913 | B1 * | 6/2021 | Wieler | H05K 13/0486 |
| 11,051,441 | B1 * | 6/2021 | Wieler | H05K 13/0486 |
| 11,136,191 | B1 * | 10/2021 | Rujanavech | B65G 1/137 |
| 11,157,043 | B1 * | 10/2021 | Rujanavech | G06F 1/1635 |
| 12,034,133 | B1 * | 7/2024 | Kim | B09B 3/30 |
| 2009/0321511 | A1 * | 12/2009 | Browne | H01M 10/54 705/308 |
| 2016/0354923 | A1 | 12/2016 | Kuffner, Jr. | |
| 2021/0040581 | A1 * | 2/2021 | Song | C22B 11/046 |
| 2021/0046642 | A1 | 2/2021 | Hernán | |
| 2022/0108252 | A1 | 4/2022 | Narasimhan et al. | |
| 2023/0169429 | A1 | 6/2023 | Bitiukov et al. | |

OTHER PUBLICATIONS

"Critical Materials Institute, Oddello Industries Pursue Recovery Of Rare-Earth Magnets From Used Hard Drives", Retrieved From: https://www.ornl.gov/organization-news/critical-materials-institute-oddello-industries-pursue-recovery-rare-earth-0, Aug. 16, 2016, 4 Pages.

"Data storage", Retrieved from: https://en.wikipedia.org/wiki/Data_storage, Mar. 26, 2023, 4 Pages.

"Hard disk drive", Retrieved from: https://en.wikipedia.org/w/index.php?title=Hard_disk_drive&oldid=1150533518, May 25, 2023, 35 Pages.

"Life-cycle assessment", Retrieved from: https://en.wikipedia.org/w/index.php?title=Life-cycle_assessment&oldid=1140874481, May 15, 2023, 31 Pages.

"Optimize Your Infrastructure With Technology Lifecycle Services", Retrieved from: https://www.ibm.com/downloads/cas/RR3GAPO6, Nov. 2022, 13 Pages.

"Rare Earth Elements: A Review of Production, Processing, Recycling, and Associated Environmental Issues", Retrieved from: https://nepis.epa.gov/Adobe/PDF/P100EUBC.pdf, Dec. 2012, 135 Pages.

"Rare-earth magnet", Retrieved from: https://en.wikipedia.org/wiki/Rare-earth_magnet, Apr. 18, 2023, 7 Pages.

"Research shows promising ways to recycle neodymium", Retrieved from: https://www.stenarecycling.com/news-insights/insights-inspiration/guides-articles/research-shows-promising-ways-to-recycle-neodymium/, Retrieved Date: Apr. 26, 2023, 3 Pages.

"Robotic Process Automation", Retrieved From: https://www.uipath.com/rpa/robotic-process-automation, Retrieved Date: Apr. 26, 2023, 13 Pages.

"Value Recovery Project, Phase 2", Retrieved from: https://thor.inemi.org/webdownload/2019/iNEMI-Value_Recovery2_Report.pdf, Aug. 2019, 85 Pages.

Andrez, Maria, "Introduction To Printed Circuit Boards", Retrieved from: https://pcbtracks.com/printed-circuit-boards/, Feb. 27, 2022, 22 Pages.

Burton, Jason, "U.S. Geological Survey Releases 2022 List Of Critical Minerals", In the office of Communications and Publishing, Feb. 22, 2022, 7 Pages.

Gross, et al., "Why Big Tech Shreds Millions Of Storage Devices It Could Reuse", Retrieved From: https://arstechnica.com/information-technology/2022/10/why-big-tech-shreds-millions-of-storage-devices-it-could-reuse/, Oct. 6, 2022, 7 Pages.

Jin, et al., "Life Cycle Assessment Of Emerging Technologies On Value Recovery From Hard Disk Drives", In Journal Of Resources, Conservation and Recycling, vol. 157, Jun. 2020, 33 Pages.

Liang, et al., "Modeling the Value Recovery of Rare Earth Permanent Magnets at End-of-Life", In Proceedings of The 22nd CIRP conference on Life Cycle Engineering vol. 29, May 21, 2015, pp. 680-685.

Simon, et al., "A Semi-automatic System for Efficient Recovery of Rare Earth Permanent Magnets from Hard Disk Drives", In Proceedings of the 25th CIRP Life Cycle Engineering Conference, Apr. 30, 2018, pp. 916-920.

Sprecher, et al., "Life Cycle Inventory of the Production of Rare Earths and the Subsequent Production of NdFeB Rare Earth Permanent Magnets", In Journal of Environmental science & technology, vol. 48, Issue 7, Feb. 27, 2014, 13 Pages.

Staub, Colin, "Greentec Robot Dismantling Drives For Magnet Recovery", Retrieved from: https://www.greentec.com/blog/greentec-robot-dismantling-drives-for-magnet-recovery, May 31, 2019, 8 Pages.

Staub, Colin, "Rare Earth Magnet Recovery Feeds New Hard Drives", Retrieved From: https://resource-recycling.com/e-scrap/2019/05/02/rare-earth-magnet-recovery-feeds-new-hard-drives/#:~:text=A%20major%20EM%2C%20a%20reverse%20logistics%20firm%20and,recovered%20magnets%20into%20thousands%20of%20new%20hard%20drives, May 2, 2019, 2 Pages.

Van Gosen, et al., "Critical Mineral Resources of the United States-Economic and Environmental Geology and Prospects for Future Supply", Retrieved from: https://pubs.usgs.gov/pp/1802/o/pp1802o.pdf, Dec. 19, 2017, 44 Pages.

Yildiz, et al., "A Visual Intelligence Scheme for Hard Drive Disassembly in Automated Recycling Routines", In International Conference on Robotics, Computer Vision and Intelligent System, Nov. 2020, pp. 17-27.

International Search Report and Written Opinion received for PCT Application No. PCT/US2024/026923, Sep. 11, 2024, 15 pages.

* cited by examiner

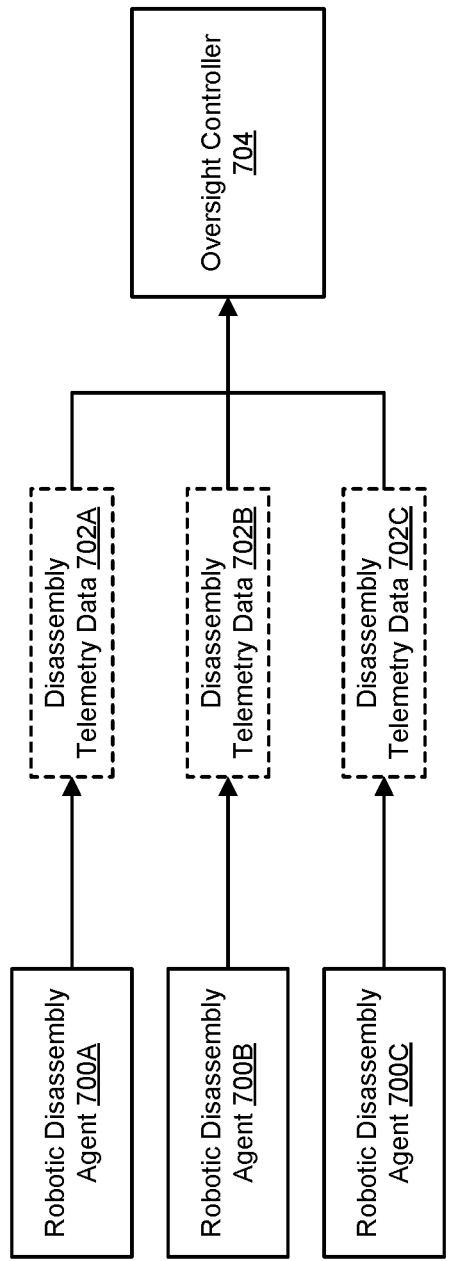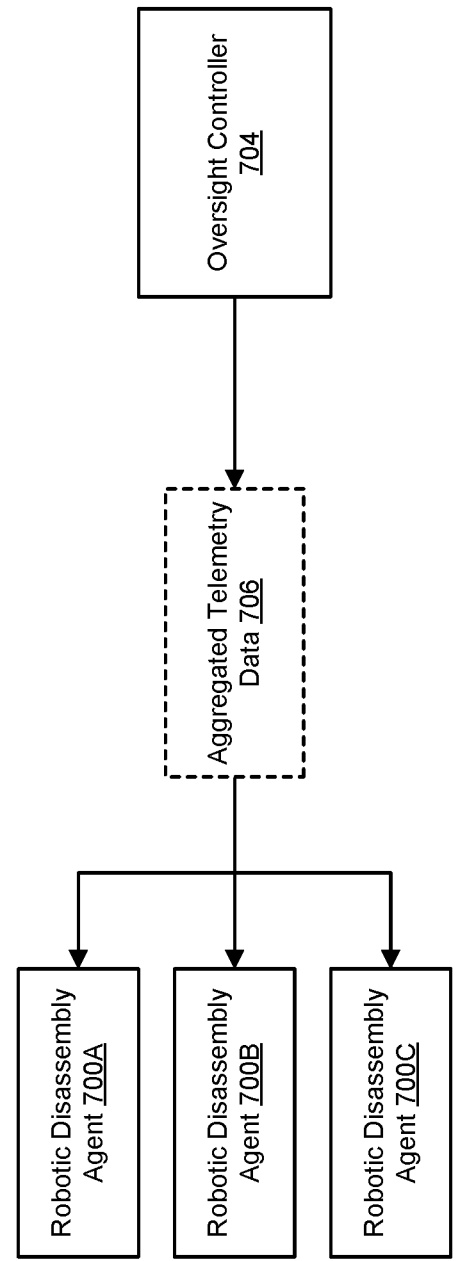

COMPUTERIZED DEMANUFACTURING SYSTEM

CROSS REFERENCE TO RELATED APPLICATIONS

This application claims priority to U.S. Provisional Patent Application No. 63/503,661, filed May 22, 2023, the entirety of which is hereby incorporated herein by reference for all purposes.

BACKGROUND

In many cases, when an electronic device reaches its end of life, it is destroyed and/or otherwise disposed of, leaving little to no opportunity for reuse or recycling. This is applicable to devices such as hard drives, which are used in large numbers in computer data centers and are replaced over time as they age, as well as consumer devices such as smartphones, tablets, and laptops.

SUMMARY

The present disclosure is generally directed to techniques for automated disassembly of electronic devices using a computerized demanufacturing system. The computerized demanufacturing system receives a target electronic device, and collects a set of sensor data quantifying physical properties of the target electronic device using a set of one or more sensors. Based at least in part on the sensor data, correspondences are identified between interactable elements of the target electronic device, and effectors of the computerized demanufacturing system. The interactable elements are then automatically manipulated using the effectors of the computerized demanufacturing system to at least partially disassemble the target electronic device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 7A-7B schematically illustrate transmission of disassembly telemetry data to an oversight controller.

DETAILED DESCRIPTION

The present disclosure is generally directed to techniques for automated disassembly (also referred to as "demanufacturing") of electronic devices. According to the techniques described herein, electronic devices are automatically disassembled into one or more subcomponents, at least some of which can be recycled and/or directly reused in construction of a new device. This promotes environmental sustainability by reducing consumption of raw materials and can additionally contribute to cost savings.

Hard disk drives (HDD) will be used as one non-limiting example of an "electronic device" throughout the present disclosure. Often, when an HDD reaches its end of life, it is shredded as a whole unit. This shredded material includes a heterogeneous mix of metals and plastics (e.g., from components such as printed circuit boards (PCB), screws, magnetic data platters, and metal enclosures), which would be difficult to separate as fragmentary pieces, and if recycled, would result in low recycling efficiency and lower quality recycled material output. If, instead, the hard drive is disassembled, then components of the hard drive can be separated as whole pieces, and at least some material can be recycled with a higher efficiency.

It will be understood that HDDs are only one non-limiting example of an electronic device that can be demanufactured. The techniques described herein are broadly applicable to a wide range of electronic devices, including other types of data-storage hardware (e.g., solid state drives, random access memory modules), logic hardware (e.g., processors), networking devices, entire computing devices (e.g., rack servers, mobile computing devices), consumer electronic devices (e.g., smartphones, tablets, laptops), etc.

In general, the demanufacturing techniques are described herein as being performed by a computerized demanufacturing system. This includes at least one robotic disassembly agent, as will be described in more detail below. In some examples, the computerized demanufacturing system includes multiple robotic disassembly agents, each of which may have the same or different capabilities. A robotic disassembly agent uses various effectors (e.g., tools such as screwdrivers, clamps, suction cups, desoldering tools) to manipulate various interactable elements of an electronic device to carry out a sequence of one or more disassembly steps. In some examples, multiple different disassembly sequences are applied to the same electronic device by the same and/or different robotic disassembly agents.

Figure 1:
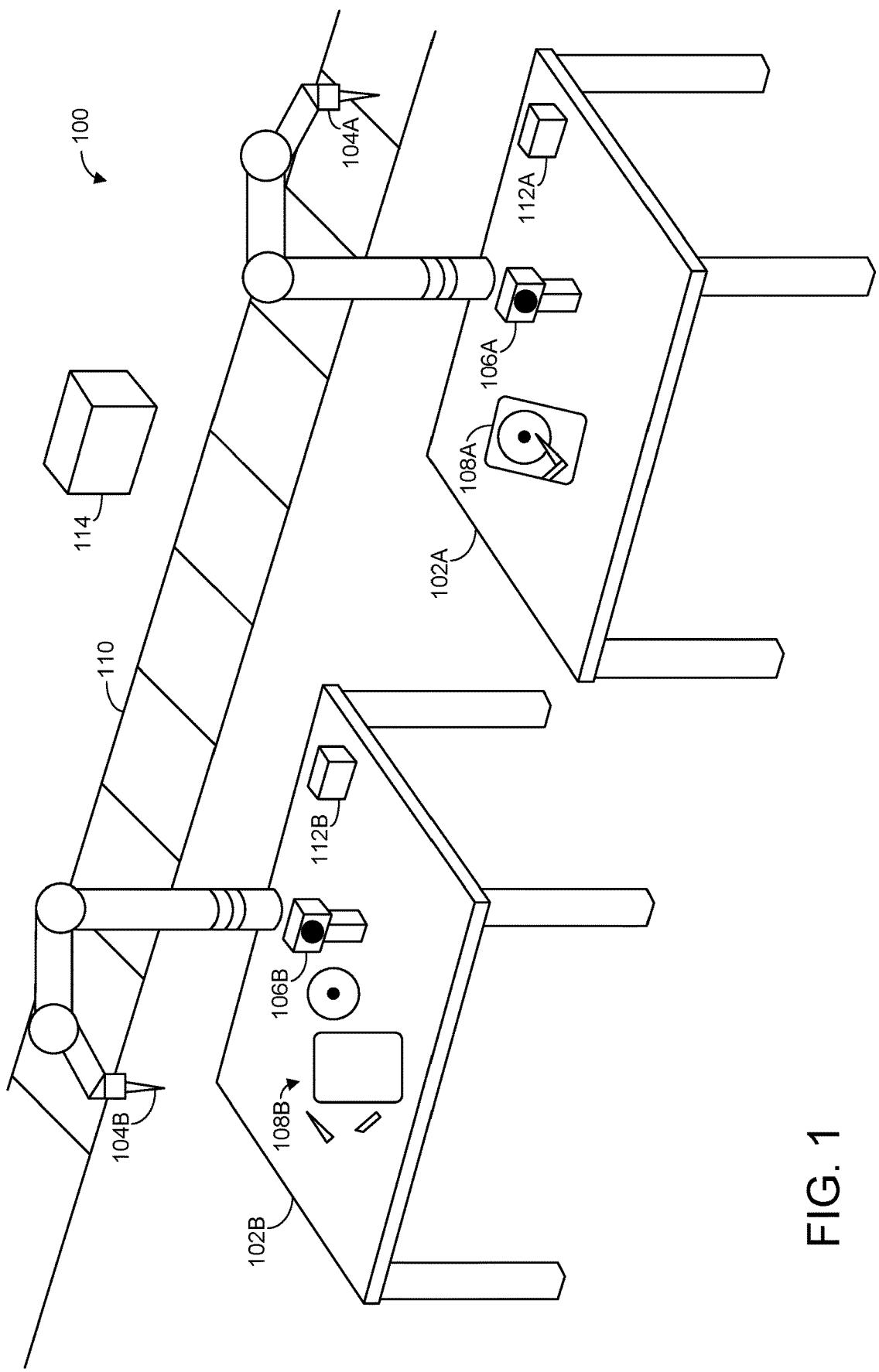
FIG. 1 schematically illustrates example robotic disassembly agents of a computerized demanufacturing system.

FIG. 1 schematically illustrates aspects of an example computerized demanufacturing system 100. It will be understood that FIG. 1 is greatly simplified and provided only for the sake of explanation. The specific appearances of the devices and objects shown in FIG. 1 are non-limiting.

As shown, FIG. 1 includes two robotic disassembly agents 102A and 102B. In general, a computerized demanufacturing system may include any suitable number of one or more robotic disassembly agents, each of which may have any suitable capabilities and/or roles. In general, robotic disassembly agents include one or more effectors (e.g., tools for performing disassembly operations), and/or sensors. In the example of FIG. 1, the robotic disassembly agents each include a respective effector 104A/104B, and a respective sensor 106A/B. Non-limiting examples of various suitable effectors and sensors that may be included in robotic disassembly agents are provided below.

In the specific example of FIG. 1, the two or more effectors include robotic arms of the two or more robotic disassembly agents. The robotic arms are configured to perform different disassembly functions using different tools (e.g., screwdrivers, solder tools, welders, pry tools, grip tools, magnet tools). In some examples, one robotic arm supports two or more different tools that are selectable. For instance, the same arm may have multiple different integrated tools that can be switched between or otherwise used independently. As another example, different tools may be removably attachable to the arms—e.g., depending on the current task, a tip, toolhead, attachment, or other aspect of a robotic arm may be replaced or equipped to perform the task. In general, an "effector" refers to any suitable tool used in disassembly of electronic devices, and an "effector" may have any suitable capabilities (e.g., functions, range of motion). It will be understood that the different robotic disassembly agents need not each have the same selection of effectors and/or sensors. For example, one robotic disassembly agent may include different types of effectors, configured to perform different types of functions, from other robotic disassembly agents.

In the example of FIG. 1, the computerized demanufacturing system has received a target electronic device for disassembly. Specifically, in FIG. 1, the target electronic device is an HDD 108A, which will be disassembled at least partially by robotic disassembly agent 102A. For instance, as will be described in more detail below, the target electronic device may be at least partially disassembled via manipulation of one or more interactable elements of the target electronic device (e.g., screws, faceplates, data platters), using one or more effectors of the robotic disassembly agent (e.g., screwdrivers, pry tools, gripper tools). A second target electronic device 108B has been partially disassembled by robotic disassembly agent 102B. In this example, new electronic devices for disassembly arrive via a conveyor belt system 110, which is also used for output of disassembled components. Additional non-limiting example material handling scenarios will be described below.

Functions performed by the computerized demanufacturing system are coordinated using any suitable number of discrete computing devices, each having any suitable capabilities and physical locations. In the example of FIG. 1, operations of the robotic disassembly agents 102A and 102B are controlled by on-board controllers 112A and 112B. As will be described in more detail below, robotic disassembly agents in some cases transmit disassembly telemetry data to an oversight controller 114, which provides aggregated telemetry data to the robotic disassembly agents. In this manner, disassembly sequence improvements learned by one robotic disassembly agent may be gradually propagated to other robotic disassembly agents, as will be described in more detail below. Each of controllers 112A/112B and oversight controller 114 may be implemented as computing system 800 described below with respect to FIG. 8.

As will be described in more detail below, the computerized demanufacturing system may use suitable machine learning (ML) and/or artificial intelligence (AI) techniques in generating a disassembly sequence for an electronic device. Non-limiting examples of suitable ML and AI technologies will be described below with respect to FIG. 8. In some examples, each robotic disassembly agent uses reinforcement learning (RL) techniques to generate a disassembly sequence for an electronic device, and over time, explore different iterations of the disassembly sequence to find improvements (e.g., by improving speed, reducing the number of steps, and/or improving the overall success rate). Furthermore, in some examples, information learned by one robotic disassembly agent is shared with an oversight system that aggregates data from several different robotic disassembly agents. From there, the oversight system may propagate learned information to the group of robotic disassembly agents, such that disassembly improvements learned by one agent are eventually implemented by other robotic disassembly agents.

Figure 2:
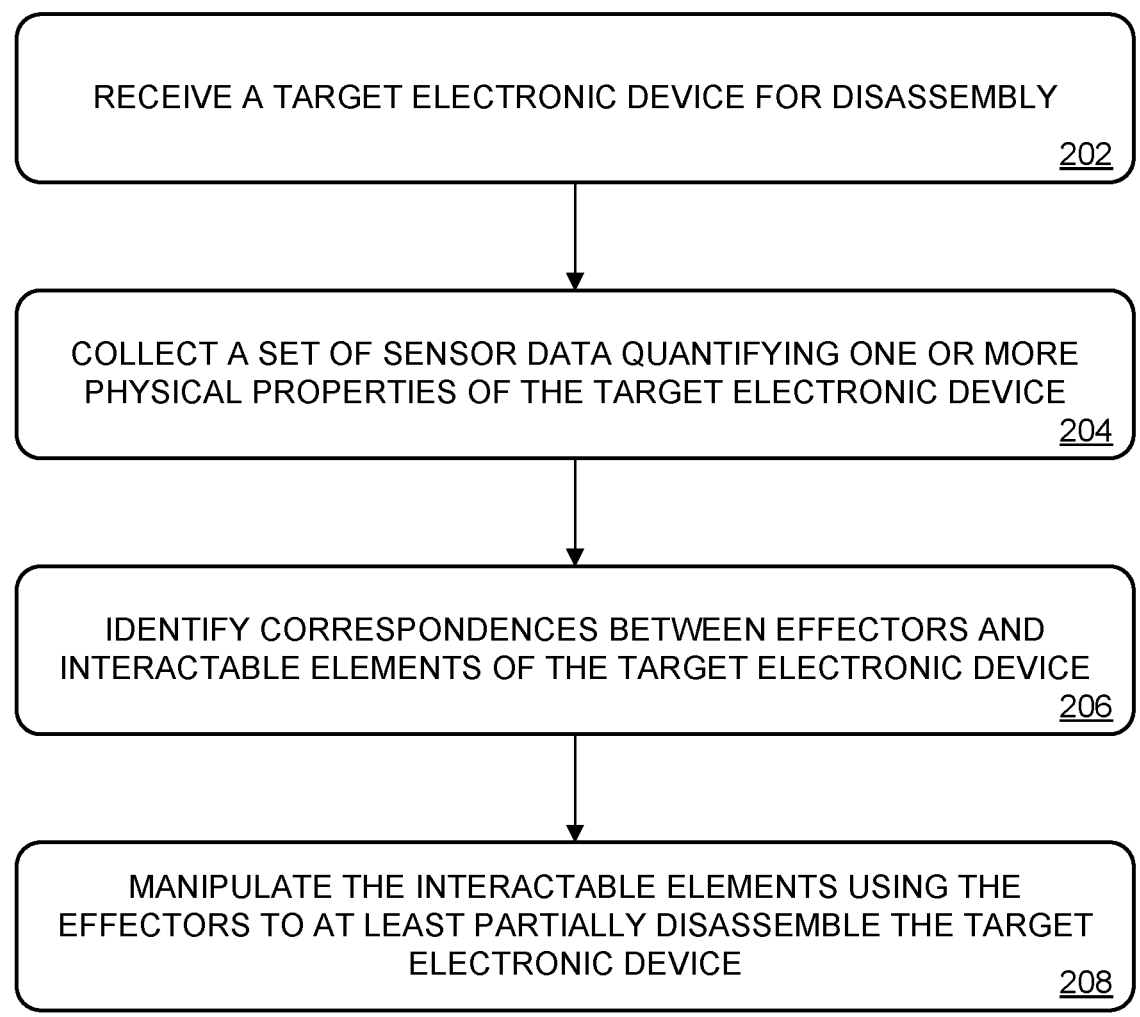
FIG. 2 shows an example method for automated device disassembly.

FIG. 2 illustrates an example method 200 for automated device disassembly. Steps of method 200 are generally described as being performed by a computerized demanufacturing system. Functions performed by the computerized demanufacturing system may be distributed between any suitable number of discrete computing devices, each having any suitable capabilities, hardware configuration, and form factor. In general, each robotic disassembly agent includes (or is otherwise controlled by) its own respective computing device. Additionally, as will be described in more detail below, each of the robotic disassembly agents are in some cases communicatively coupled with an oversight controller, which is configured to receive information from the robotic disassembly agents and propagate the received information to other robotic disassembly agents. In some examples, the computerized demanufacturing system is implemented as computing system 800 described below with respect to FIG. 8.

Method 200 includes, at 202, receiving a target electronic device for disassembly. This generally refers to the computerized disassembly system detecting presence of a new electronic device—e.g., through a change in sensor data (such as an increase in weight measured by a scale, detection of a new object or barcode by a camera), and/or via manual human input that a new device has been delivered for disassembly. The target electronic device may be transported to machines of the computerized demanufacturing system for sensor data collection and/or disassembly in any suitable way. For instance, the target electronic device may be transported using a suitable conveyor system, moved by a robotic arm (e.g., using a gripper, suction, or magnet tool), or carried by a human, as non-limiting examples.

The target electronic device may take any suitable form. As discussed above, HDDs are one specific example of an electronic device that is often consumed and destroyed in large quantities—e.g., in computer data centers. However, it will be understood that the techniques described herein are applicable to any of a wide variety of different electronic devices that can be physically disassembled in a similar manner. Examples include consumer electronic devices (e.g., smartphones, tablets, laptops), computer components (e.g., data storage, memory, logic, power supplies), entire computing devices (e.g., rack servers), audio/video systems (e.g., stereos, receivers, speakers), appliances, etc.

At 204, method 200 includes, using one or more sensors of the computerized demanufacturing system, collecting a set of sensor data quantifying one or more physical properties of the target electronic device. In some examples, the sensor data is used to apply one or more device categories to the target electronic device—e.g., for the purpose of identifying disassembly sequences that have been used to successfully disassemble the same or similar electronic devices in the past.

It will be understood that any suitable number of different categories may be maintained by the demanufacturing system, and any suitable number of categories may be applied to any particular target electronic device (e.g., one category, zero categories, two or more categories). In some examples, an initial set of categories for application to electronic devices is defined by a human operator. Additionally, or alternatively, new categories may be generated over time by the computerized demanufacturing system—e.g., upon encountering new device types. Each category may have any suitable granularity. As non-limiting examples, categories may refer to different device types (e.g., hard drive, solid state drive, non-volatile storage, battery-backed RAM storage), different device form factors (e.g., 3.5", 2.5", surface mount chip), different device manufacturers, specific device identifiers (e.g., serial numbers, product names, unique hardware identifiers, batch numbers), device condition indicators (e.g., damaged, nonfunctional, components missing), accessory presence (e.g., device includes a hot-swap caddy), etc.

Any suitable input sensors may be used. As one non-limiting example, the input sensors include a computer vision system, in which one or more cameras capture images of the target electronic device. A suitable computer vision algorithm (e.g., machine learning trained model) may then be used, which attempts to classify the device depicted by the input images as corresponding to one or more different electronic device categories. As additional non-limiting examples, the input sensors may include cameras (e.g., visible light cameras, depth cameras, infrared cameras), mass/weight sensors (e.g., scales), size measurement devices (e.g., calipers), thermal sensors, radio frequency detectors, acoustic sensors, magnetic field sensors (e.g., magnetometers), electrical monitoring sensors (multimeters), chemistry-based sensors (e.g., pH meters, moisture detectors), etc.

The input sensors are integrated into any suitable system of one or more computing devices. As will be described in more detail below, the input sensors are in some cases integrated into a robotic disassembly agent having a "coordinator" role, configured to collect information on the target electronic device, and assign disassembly "jobs" to other robotic disassembly agents having other roles. In some cases, every robotic disassembly agent has the same or similar sets of input sensors. In other examples, some robotic disassembly agents may lack one or more input sensors that other agents are equipped with—e.g., a coordinator agent may have a unique hardware configuration that is more suited to device classification than to device disassembly.

In some examples, a supervised learning system is used to categorize the target electronic device. For instance, in some examples, the one or more device categories are applied to the target electronic device by a machine learning model previously trained to classify electronic devices as belonging to one or more electronic device categories based on input sensor data. This process is referred to herein as device classification or device categorization. The model may be trained in any suitable way. In some examples, the model is trained on a training data set that includes human-labeled and/or human-gathered training examples. For instance, a training example may take the form of a specific set of sensor data (e.g., images of an electronic device), labeled with the categories that should be applied based on the sensor data. Furthermore, in some examples, human operators may correct one or more categories applied by the system to a target electronic device. For instance, improper categorization may result in a failed demanufacturing attempt, causing a human operator to be notified of the failure. Upon review, the human operator may manually apply the correct categories to the target electronic device, and thereby provide feedback to the supervised learning model. Similarly, human operators may introduce new categories, and/or manually specify categories for any given target electronic device (e.g., a new model) at any time.

The output of the classification process is in some examples expressed as a probability distribution of the device against each category. For instance, a category may be applied to the target electronic device if the probability distribution for that category exceeds a confidence threshold. If no categories exceed the confidence threshold, then the system in some examples prompts a human operator to select a category for the target electronic device, and/or to create a new category and set the target electronic device as the first example for the new category.

Upon completion of a disassembly sequence for a target electronic device, information about the disassembly sequence may be used to provide feedback to the classification model. Such information may include, for instance, a list of categories applied to the device, and/or a result (e.g., success or failure) of the demanufacturing process. For example, a successful disassembly sequence may serve as positive reinforcement for the classification model (e.g., the predicted categories were likely correct), while an unsuccessful disassembly sequence may serve as negative reinforcement (e.g., the failure may have been due to incorrect categorization).

In some examples, multiple different pre-trained models are used in device classification. For instance, in some cases, applying the one or more device categories includes performing a preliminary categorization based on the set of sensor data. Upon determining that a confidence of the preliminary categorization is less than a confidence threshold, in some examples a supplemental categorization is then performed, based on a supplemental set of sensor data collected using the one or more sensors of the computerized demanufacturing system.

In some examples, the preliminary classification is done based on relatively limited sensor data (e.g., based only on images of the device and/or an estimated size of the device), which can improve the speed of the classification process in cases where such limited information is sufficient to classify the device with high confidence. In some cases, another pre-trained model outputs a recommendation as to whether additional sensor data should be collected for further classification. If yes, then a supplemental classification step may be performed based on relatively more data (e.g., device weight and/or magnetic field readings). In other words, the supplemental set of sensor data in some cases includes one or more sensor data types not used for the preliminary classification.

This approach beneficially improves the speed of the classification process. For example, as the performance of the preliminary classification system improves, it may develop a capability to classify the device with sufficient accuracy that supplemental sensor data is rarely recommended—e.g., the preliminary classification model may identify sufficiently distinguishing details from the device's PCB and/or a printed device label. In some examples, the recommendation system receives negative feedback when it recommends a supplemental measurement, but collection of supplemental sensor data does not change the preliminary classification for the device. It will be understood that any suitable number of classification steps may be used, and each classification step may in some cases consider different types of input sensor data.

Figure 3:
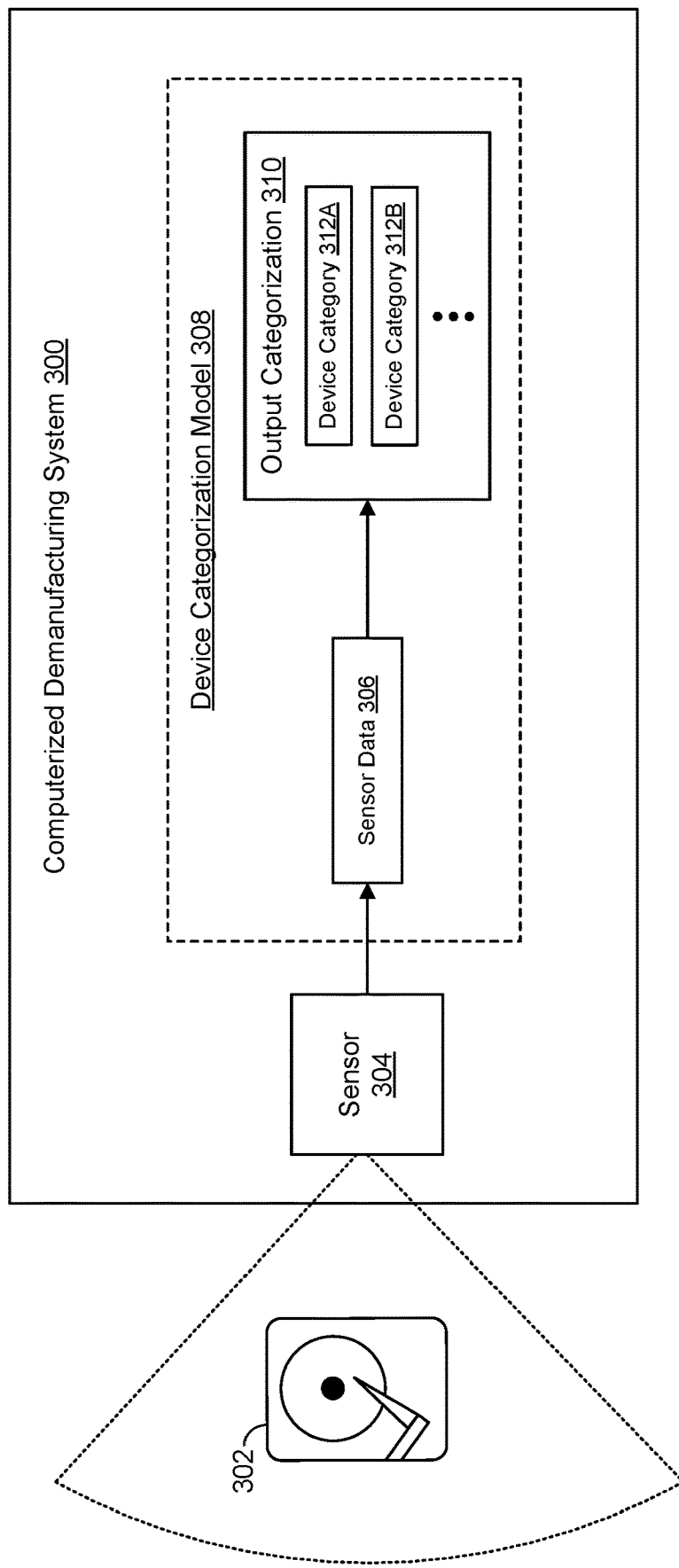
FIG. 3 schematically illustrates categorization of a target electronic device.

Device categorization is schematically illustrated with respect to FIG. 3. As shown, a schematic representation of a computerized demanufacturing system has received a target electronic device 302 for disassembly. Using a sensor (e.g., camera) of the computerized demanufacturing system, such as a camera included in a "coordinator" type robotic disassembly agent, a set of sensor data 306 is collected. In this example, the set of sensor data is provided to a previously trained, machine learning device categorization model 308, which outputs a categorization 310 that specifies various device categories 312A/312B applied to the target electronic device.

Once sensor data is collected, the computerized demanufacturing system in some cases selects a particular robotic disassembly agent to attempt to at least partially disassembly the target electronic device. This may include the computerized demanufacturing system defining a disassembly "job" for the target electronic device. In some embodiments, a job specifies information about the device for disassembly (e.g., the categories applied to the device, and/or sensor data collected for the device), a successful end goal state (e.g., a specific set of parts have been successfully removed and separated), a maximum "cost" for the disassembly job, and/or other applicable information. An agent may be selected for demanufacturing the target electronic device based at least in part on a comparison between the role, history, and/or capabilities of the agent, and the criteria of the job defined for a particular target electronic device.

In some cases, when a new device type is introduced for disassembly, initial disassembly job criteria for demanufacturing the new device type may be at least partially specified by a human operator—e.g., the human defines the successful goal state and maximum cost. Once the new device type has been successfully demanufactured a sufficient number of times (e.g., at least once), then disassembly jobs for future instances of the new device type may be generated and executed with little to no human intervention. For example, each time a device is disassembled, the job criteria and specific disassembly sequence used in disassembling the device may be saved in a record along with the categories applied to the device. When the same or similar categories are applied to other devices in the future, the prior job criteria and disassembly sequence can be retrieved and reused.

Alternatively, in some examples, job criteria for a new device type may be generated based at least in part on documentation for the device type. For example, in some cases, manufacturers of the devices intended for disassembly may provide documentation for their devices to promote recycling. Such documentation can include, for example, schematics, parts lists, and/or specific disassembly instructions. Such disassembly instructions may be provided in any suitable form. For instance, the disassembly instructions may be provided as computer code that is directly executable by a robotic disassembly agent to disassemble a particular electronic device. As another example, the disassembly instructions may be provided in plain language (or another suitable form), and translated into computer instructions by a human operator, and/or by a pre-trained language model (e.g., a generative language model, or a multi-modal model).

In some examples, the agent selection process uses a bidding system, in which different robotic disassembly agents bid on each demanufacturing job. In such examples, each agent that is willing to take the job will assess the job and return a bid that includes the agent's confidence level that the job can be successfully completed, and the estimated cost of the job. As will be described in more detail below, in some examples, a robotic coordinator agent generates a disassembly job based on collected sensor data, and then assigns the job to a selected robotic disassembly agent based on the bid submitted by the selected robotic disassembly agent, where the bid expresses a confidence of successful job completion for the disassembly job.

In some examples, each agent's success confidence measure is based upon that agent's success history for prior jobs involving devices classified with the same or similar categories. For instance, the confidence level may be expressed as a ratio of successful disassembly completions for a certain device type, vs the number of total attempts for that device type. In other words, in some cases, the confidence of successful job completion is estimated by a robotic disassembly agent based at least in part on the successful end goal state and maximum job cost specified in the disassembly job, and a history of prior job completion by the robotic disassembly agent.

In general, the "cost" of a job may be based on a combination of various suitable parameters, such as a time parameter, an energy parameter, and a maintenance parameter (e.g., the frequency with which the job type causes robotic disassembly agents to require maintenance). These values may be quantified and averaged over time as jobs are executed—e.g., using a time exponential decay function. In some cases, these values are distributed via a credit assignment process. The overall cost of a job is in some cases calculated by combining the contribution of each parameter. In some cases each parameter can be the summation of $a_k X^k$ with k ranging from 0 to n. In some cases each ax may be determined using a machine learning trained model.

$$\sum_{k=0}^{n} a_k x^k$$

where a represents the trained weights and x represents a parameter value such as the time to complete the action.

More generally, in some examples, the "cost" of a job is proportional to the estimated total time required to complete the job, and inversely proportional to the "value" returned by successful completion of the job. Value can refer both to the monetary value of the resulting output materials (e.g., a monetary parameter), as well as the environmental impact savings achievable through reuse or recycling of the output materials (e.g., an environmental parameter). For example, a relatively short and simple disassembly job that returns valuable and/or recyclable components would have a relatively low cost, while a longer disassembly job that returns lower value and/or less recyclable components would have a relatively higher cost. It will be understood that the actual values of the monetary and/or environmental parameters may take any suitable form, depending on the implementation.

In other words, the value of a job may be based both on the weighted value of cost saving or cost avoidance in dollars, as well as the environmental impact savings. In this manner, the overall value of the job may be based on the sum of all parameters for all of the parts being disassembled. In some cases, the specific values for each weighting may be based on various environmental and/or business assumptions—e.g., based on current inventory and/or market conditions, the weights applied during value calculation may be tuned to prioritize monetary savings or environmental savings.

In summary, according to one non-limiting example, each agent is presented with information on a potential disassembly job, including information regarding the device to be disassembled (e.g., the specific categories applied to the device based on sensor data), and a final goal state (e.g., a specific set of disassembled parts). Each agent may then place a bid to take the job, where each bid specifies that agent's confidence level and estimated cost for successful completion.

After receiving bids, the "winning" agent to which the disassembly job is assigned may be determined in any suitable way. As will be discussed in more detail below, a robotic coordinator agent that previously generated the disassembly job may calculate suitability parameters for each bid that it receives, and assign the disassembly job to a selected robotic disassembly agent based at least in part on a corresponding suitability parameter calculated for the selected robotic disassembly agent.

In some examples, a configurable formula is used to output a suitability parameter indicative of a particular agent's suitability for completing the job, based on that agent's reported confidence level and estimated cost. As one approach, the job may automatically be assigned to whichever agent has the overall highest suitability parameter. As another approach, some degree of randomization may be used in agent selection—e.g., jobs are more likely to go to agents with relatively higher suitability values but can still be assigned to relatively less suitable agents. This can beneficially enable less utilized agents to develop more experience with certain job types and can contribute to more effective and novel disassembly sequences being discovered.

In some examples, different robotic disassembly agents have different roles. An agent's role may influence the types of jobs to which it is assigned—e.g., an agent's role may influence weights applied to that agent's confidence level and/or estimated cost when submitting bids for a job. In other words, a robotic coordinator agent may assign a disassembly job to a selected robotic disassembly agent based at least in part on a role identity of the selected robotic disassembly agent. Non-limiting examples of agent roles and their associated functions will now be described.

Coordinator—An agent designated as a "coordinator" may in some cases be responsible for gathering information on a target electronic device. For example, a coordinator may be configured to perform the device classification functions described above. In some examples, the coordinator provides information regarding the electronic device to other agents. For example, the coordinator may be responsible for generating job criteria for the target electronic device and for soliciting bids for the job from a plurality of other robotic disassembly agents. The coordinator may include a mechanism for moving the electronic device to the agent that submits a winning bid. For example, the coordinator may include a robotic arm that physically deposits the target electronic device on a work surface corresponding to the winning agent, or on a conveyor belt that moves toward the winning agent. Additionally, or alternatively, the coordinator may itself be configured to perform one or more disassembly steps on the target electronic device, effectively using the robotic disassembly agent for both the disassembly role and the coordinator role.

In training—An agent may be designated as "in training" when it has relatively low experience in a particular configuration. This may be due to the agent using a new software version, and/or a new hardware configuration, as examples. In some cases, bids submitted by "in training" agents may be weighted relatively higher, such that the agent is more likely to win the bid and thereby accumulate more experience.

Retiring—An agent may be designated as "retiring" for various reasons. For example, an agent may be "retiring" to limit or reduce its usage as it waits for scheduled maintenance or repair, to reduce wear on the agent, because the agent is nearing its end of life, and/or because the agent is scheduled for relocation to a different team or facility. In some cases, bids submitted by "retiring" agents are weighted relatively lower, such that the agent is less likely to win the bid.

Supervisor—In some examples, an agent designated as a "supervisor" has a relatively large amount of experience, has demonstrated success at a wide range of device types, and has a relatively wider range of supported actions, sensors, and/or effectors than other agents. A supervisor agent may beneficially be used to try out additional actions and explore alternative strategies and methods when it is predicted that all the bidding agents have a low probability of successful completion of the goal. For example, upon determining that a relatively low number of agents (e.g., zero) have submitted bids indicating that they are capable of completing a job for under maximum cost, the supervisor may itself submit a bid. In some cases, bids submitted by "supervisor" agents have higher weightings, such that the supervisor is relatively more likely to be assigned the job. In some cases, cost calculations pertaining to supervisor agents may prioritize successful job completion over other factors (e.g., job length, total cost), enabling supervisors to take more time and utilize relatively more expensive actions to be successful. In some examples, a disassembly agent having another role may ask the supervisor for help if it fails to achieve one or more goals.

In some examples, the computerized demanufacturing system may define human operators as another type of "agent" to which jobs can be assigned. As examples, a job may be assigned to a human operator upon determining that a particular device cannot be classified with sufficiently high confidence, there are no agents that can complete the job for less than the maximum cost, an unsuccessful disassembly attempt was made, and/or an error state (such as a security or safety issue) is detected. In general, the computerized demanufacturing system may receive input (e.g., feedback, explicit disassembly instructions) from human operators at any time—e.g., before, during, or after execution of a disassembly job. For example, part way through a disassembly job, a human operator may provide explicit instructions that override the current disassembly sequence being run by a robotic disassembly agent.

It will be understood that, in any case where human operators provide input, the system may monitor the success/failure that results from implementing the input, and incorporate the human input into future disassembly tasks (e.g., human input may be used for retraining and refining machine-learning models). Any and all applicable and reasonable safety precautions will be implemented to ensure the safety of human workers interacting with robotic disassembly agents, and/or other aspects of the system.

Figure 4A:
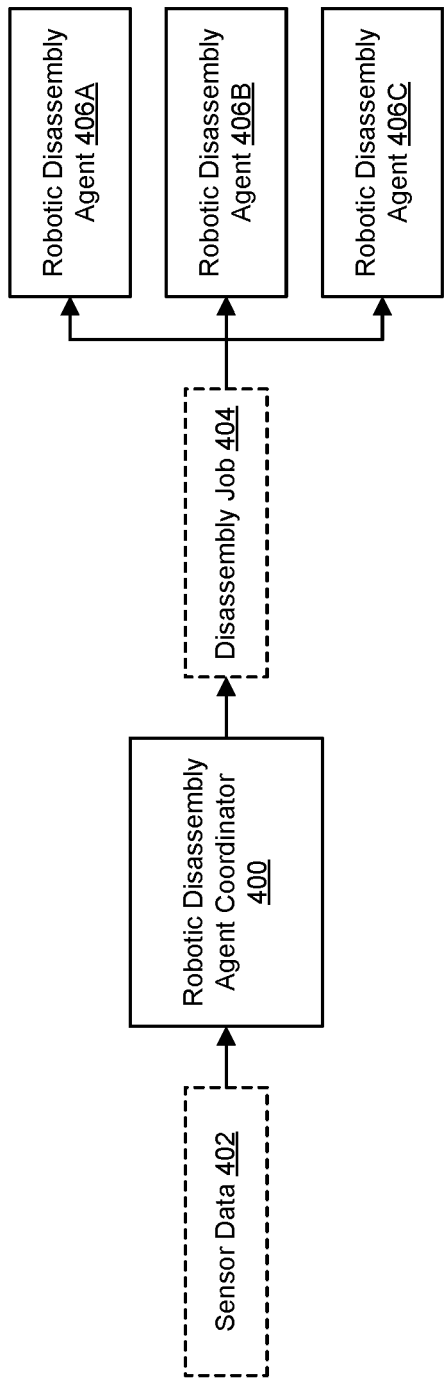
FIGS. 4A and 4B schematically illustrate generation of a disassembly job for a target electronic device.
Figure 4B:
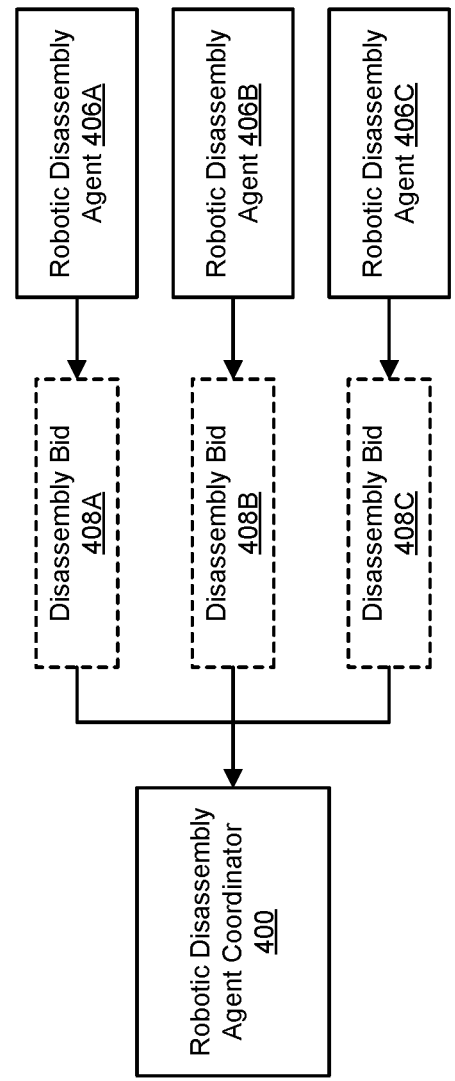

Disassembly job generation and assignment is schematically illustrated with respect to FIGS. 4A and 4B. Specifically, FIG. 4A schematically shows a robotic disassembly agent 400 having a coordinator role identity. The coordinator 400 receives a set of sensor data (e.g., via one or integrated and/or external sensors), and based at least in part on the sensor data, generates a disassembly job 400. Information relating to the disassembly job is transmitted to various other robotic disassembly agents 406A, 406B, and 406C, which may have different role identities as described above.

In FIG. 4B, based on the disassembly job, the robotic disassembly agents generate disassembly bids 408A, 408B, and 408C. The disassembly bids are transmitted to the coordinator 400 for consideration. After selection of a winning bid, the target electronic device is assigned to the corresponding robotic disassembly agent for at least partial disassembly.

One non-limiting example scenario will now be described. In this example, the target electronic device for disassembly takes the form of an HDD. First, a coordinator agent uses a computer vision system to capture images of the hard drive (e.g., six images may be captured, one for each facet of the device). The computer vision system may include several cameras at known fixed locations, and/or a moveable camera mounted to a robotic arm. The computer vision system may include lighting control to enable capture of repeatable images with clearly visible features.

Based on the captured images, and a known camera calibration, the device envelope dimensions are estimated. A pre-trained preliminary classification model then classifies the HDD as a 3.5" hard drive with no accessories based on the estimated dimensions and the captured images. In some examples, a separate recommendation system (e.g., implemented as another pre-trained model) evaluates whether additional measurements should be collected, based on a confidence of the preliminary classification, and whether the classification could be consistent with multiple types of devices. For example, hard drives and solid-state drives may have superficially similar characteristics in terms of size and appearance, and thus additional measurements may in some cases be required to distinguish between the two device types. Accordingly, in this example, the recommendation system recommends two additional measurements: weight and magnetic field. The weight of the hard drive is measured with a scale. The magnetic field strength may, as one approach, be measured at each of the four corners of the drive, noting the location of the highest field strength, and calculating the difference between the highest observed field strength and the average field strength.

In this example, because there was a recommendation for additional information and that information was gathered, a second classification is made based on the additional weight and magnetic field information. For instance, the second classification may be performed by the same pre-trained model that performed the preliminary classification, or a separate model trained on additional or alternative types of input data. In this example, the second classification is done based on the input images, estimated dimensions, weight, and magnetic field measurements. It will be understood that any suitable number of classification steps may be performed.

In this non-limiting example scenario, the classification does not change based on the additional sensor data collected. However, it will be understood that upon collection of additional data, the second classification may differ from the preliminary classification. For example, if the weight is less than 500 grams, the magnetic field measurements are relatively low, and the difference in magnetic field between corners is low, then the classification may change from a 3.5" hard disk drive to a 3.5" solid-state drive.

In any case, upon final classification, a successful end state is defined for the demanufacturing job. In some examples, this is done by evaluating the Bill Of Materials (BOM) for that device class. For instance, the BOM may have been manually specified by a human operator when the device class is first introduced, and/or derived from documentation for the device class, as described above. For an HDD, this may include an aluminum enclosure, steel lid, printed circuit board (PCB), data platters, neodymium magnets, armature, spindle motor, etc. Job success may be defined as successful separation of each of these components, or successful separation of less than all of the components, depending on the scenario. For example, to balance efficiency against environmental sustainability, some jobs may be defined as successful even if less than all components of the device are separated. In addition to a successful end state, the job may define what to demanufacture (e.g., according to one or more categories applied to the device), a maximum cost of the job, and/or any other applicable information, as discussed above.

Once the HDD is classified and the job criteria are defined, it is assigned to one or more robotic disassembly agents for demanufacturing (e.g., according to the bidding process described above). Data collected by the robotic disassembly agents during disassembly of the HDD is collected and used to retrain any machine learning models used for classification, which beneficially improves the accuracy of classification.

Returning briefly to FIG. 2, at 206, method 200 includes, based at least in part on the set of sensor data, identifying correspondences between one or more effectors of the computerized manufacturing system and one or more interactable elements of the target electronic device. As described above, the sensors used to collect the sensor data, and the effectors used to manipulate interactable elements of the target electronic device, are in some examples distributed between two or more different robotic disassembly agents of the computerized demanufacturing system.

Correspondences between interactable elements of the target electronic device and effectors of the demanufacturing system are identified at any suitable time, by one or more different robotic disassembly agents. In some examples, the correspondences are identified by the robotic disassembly agent to which the disassembly job was assigned, while the robotic disassembly agent is generating a specific disassembly sequence to follow in attempting to disassemble the device.

As discussed above, the target electronic device is physically transported to the robotic disassembly agent to which it was assigned in any suitable way. For instance, in some examples, electronic devices for disassembly are placed in trays or "pucks" and added to a central conveyor belt. Agents then pull the pucks from the conveyor belt and operate on the electronic devices held within the pucks. Output materials from the disassembly process may be placed back in the pucks and returned to the conveyor belt for processing and/or additional disassembly by downstream agents, and/or output in another suitable way.

In some examples, a "puck" is a reusable container equipped with an RFID (radio frequency identification) tag that enables real-time spatial telemetry monitoring. For example, robotic disassembly agents may in some cases scan pucks traveling down the line, such that each agent can specifically pull whichever puck holds the electronic device assigned to that agent. Additionally, or alternatively, the conveyor belt system is controlled to selectively stop movement of the conveyor belt when the puck is positioned in front of the robotic disassembly agent to which it is assigned. In some examples, there is an association between a unique identifier of the device (e.g., a serial number) and a unique identifier of the puck. Telemetry data collected by tracking movements of the puck's RFID tag can in some cases be used for time and cost tracking. This is especially helpful when a job is split across multiple systems or agents, enabling the cost of disassembly for a specific device to be tracked across multiple agents. It will be understood that a puck need not always be used—e.g., in some cases, pucks are specific to device classes having relatively smaller sizes, and/or when the disassembled components need to be tracked together for security considerations.

As discussed above, a robotic disassembly agent includes various effectors, which can be used to perform a wide variety of various suitable functions. Non-limiting examples of such functions include:

Ask
Clamp
Compress
Cool
Cut
Desolder.
Drill
Expand
Glue
Grab
Grind
Grip
Heat
Measure (image, weight, magnetic field, dimension)
Move
Pinch
Pry
Punch
Push
Remove
Rotate
Shake
Suction
Tool Change
Unscrew
Unweld
Vibrate Effectors of the robotic disassembly agent apply one or more of the above functions to interactable elements of the target electronic device. A non-limiting list of example interactable elements will be given below. Such interactable elements may be detected in any suitable way. In some examples, positions of interactable elements are manually specified by a human operator—e.g., when a new device type is introduced for disassembly. Additionally, or alternatively, types and positions of interactable elements may be detected through use of suitable pre-trained machine learning models—e.g., configured to classify portions of an electronic device as interactable components based on suitable sensor data (such as input images). Furthermore, in some examples, the computerized demanufacturing system may maintain information collected over time about the interactable elements observed in different types of electronic devices, so as to more effectively manipulate such elements in the future. Non-limiting examples of information that may be stored about different types of interactable elements will also be given below.

Fastener. Information stored about fasteners may include coordinates of the fastener relative to a known state of the device, a type and/or size of the fastener (e.g., Torx #6), and/or material-related properties of the fastener (e.g., material hardness, magnetism, probability of stripping).

Plate: A "plate" may refer to a polygonal shape representing a flat surface. Examples include PCB boards, lids, aluminum enclosures, etc. Information stored for plates may include coordinates at which suction should be applied for removal, coordinates for a center of mass, weight, and/or a force required to remove the plate.

Platter: A "platter" may refer to a circular disk that stores data on a substrate, such as glass or aluminum. Stored information may include a platter count for a given HDD and/or security approved destruction actions.

Magnet assembly: This may include a magnet and any attachments (e.g., a steel mounting bracket). Stored information may include material-related properties—e.g., the material from which the magnet is constructed, a glue or fastener used to secure the magnet, and/or a material applied as a surface coating.

Armature: Information stored about armatures may include coordinates for a pivot point of an armature, and/or an angle of the armature. There may be multiple armatures within a single HDD.

Ribbon cable connector: Stored information may include a grip angle and/or coordinates of a grip location for removal.

Spindle hub: Stored information may include coordinates for a center of the spindle hub, a radius, torque required to unscrew, and/or a fastener count.

Spindle ring: Stored information may include coordinates for a center of the spindle ring, dimensional tolerance between spindle ring and spindle, and/or a radius of the spindle ring.

Platter heat dissipator: Stored information may include coordinates of a fastener hole for attachment of the heat dissipator.

Hidden screw label: Stored information may include coordinates for the center of the label covering a screw, the type or dimensions of the screw (e.g., stainless steel Torx #6), and/or the material properties of the label covering the screw (e.g., paper or mylar).

Lid pry point: Stored information may include coordinates of one or more pry points in priority order and/or angles of a prying motion for removal of a lid from an enclosure.

Weld seam: Stored information may include coordinates for the start and/or end of a welded line segment, and/or material-related properties (e.g., the types of metals welded together).

Solder weld: Stored information may include a coordinate for a center of the solder weld, a radius of the weld, the type of weld such as surface or through hole, and/or a desolder temperature based on the type of solder mixture used.

Pin: Stored information may include coordinates for the endpoint of the pin, the radius of the pin, coordinates at which to strike the pin for removal, and/or a force required to dislodge the pin.

Electronic chip: Stored information may include a bounding box for the electronic chip (e.g., defined by coordinates of opposite corners of the box), coordinates at which suction and/or desolder should be applied for removal, and/or coordinates at which force should be applied for destruction. In some cases, security approved actions for destruction may be specified, such as crack deformation after punch or drill hole pattern and depth.

Fastener Pattern: A "fastener pattern" may refer to a group of one or more fasteners. In some examples, the system calculates a centroid between all fasteners of the pattern and sums the distance from the centroid to each fastener. Stored information may include coordinates of the centroid, the total number of fasteners in the pattern, the best discovered optimal fastener removal action sequence based upon prior agent learnings, and the sum of the centroid-fastener distances. This can be used to find similar fastener patterns and match historically successful unscrew sequences.

As described above, each robotic disassembly agent in some examples attempts to complete a disassembly "job" for which it previously submitted a bid. The "job" may include a high-level recipe specific to the device classification. This recipe can be described as a set of ordered sub-goals that the agent attempts to complete. Achieving each sub goal may not be required for job success. The initial job criteria may be specified in any suitable way—e.g., in some examples, the initial job recipe and ordered sub-goals for a particular device class are specified by a human operator. Additionally, or alternatively, the initial job criteria may be provided by another suitable source—e.g., by a manufacturer of the electronic device intended for disassembly.

In some examples, the specific order of the sub-goals may change over time as new disassembly sequences are learned. Similarly, some sub-goals may be removed, and/or new sub-goals may be added. In some examples, the job success criteria and specific sub-goal constraints may be removed over time as robotic disassembly agents accumulate more experience, allowing for more flexibility for the agent to more optimally achieve the overall goals of the job with fewer intermediate constraints.

In some examples, a job additionally includes sensor data collected during device classification. The agent may choose to re-evaluate prior sensor information provided by a coordinator agent, and/or to gather additional sensor information that may contribute to successful completion of the job. As one example, an agent may use sensor data to determine the device's physical orientation, and thereby determine any manipulation needed to register the device in a fixture or jig.

During demanufacturing, in some examples, the robotic disassembly agent determines the best initial state of the device (e.g., in terms of position and orientation), and may use one or more effectors to move the device into its initial state. In some examples, the initial state is a known initial state—e.g., derived from prior disassembly of similar devices by the same or other agents, and/or specified by a human operator. There may be more than one valid initial state, in which case the agent may choose the initial state in any suitable way (e.g., according to a probability distribution based on prior successes at lowest cost).

As discussed above, a job assigned to a robotic disassembly agent in some cases specifies an end goal state (e.g., a specific set of components have been disassembled and separated), and/or a sequence of general goals for completion (e.g., remove enclosure, remove PCB, remove data platters). However, this may or may not specify the specific sequence of actions to be taken by the robotic disassembly agent (e.g., a "disassembly sequence") to achieve the specified goals.

Rather, in some cases, the specific disassembly sequence to be used in attempting to disassembly the target electronic device is generated by the target electronic device to which the target electronic device is assigned, based on detected interactable elements of the target electronic device, and effectors of the robotic disassembly agent. For instance, the robotic disassembly agent may identify correspondences between detected screws on an HDD and a screwdriver tool of the agent, and identify correspondences between solder points within the HDD and a solder tool of the agent. Additional correspondences may be identified while the disassembly sequence is in progress—e.g., as additional interactable elements are detected. Based on the identified correspondences, the agent generates a disassembly sequence of one or more disassembly steps, where each disassembly steps specifies an operation to be performed by a specified effector (e.g., unscrew a detected screw using a screwdriver tool). It will be understood that, in other examples, the disassembly sequence is generated partially or entirely by other suitable devices in the computerized demanufacturing system. For instance, the disassembly sequence may be generated at least partially by a coordinator agent or an oversight controller.

In some examples, when a robotic disassembly agent first encounters a new device type, the disassembly sequence is specified at least partially by a human operator. For instance, the human may program the agent to perform a template disassembly sequence that is known to be successful, although may not be optimal. As another example, the initial disassembly sequence for a new device type may be specified by and/or derived from documentation pertaining to the device—e.g., provided by a device manufacturer. As another example, the initial disassembly sequence may be at least partially discovered by the robotic disassembly agent. For example, the robotic disassembly agent may use suitable sensor data (e.g., a computer vision system) to classify one or more parts of the target electronic device as interactable elements (e.g., screws, clips, welded seams, solder joints) that can potentially be manipulated by effectors of the agent. The agent may then explore different potential disassembly sequences, in which it attempts to manipulate the interactable elements with corresponding effectors. In some cases, success or failure of an initial disassembly sequence may be confirmed by a human operator, and/or via suitable sensor data (e.g., a computer vision system trained to recognize device components that are intact and successfully separated).

In any case, once an initial disassembly sequence is defined, it is recorded by the computerized demanufacturing system, and can be reused for disassembly of future devices. In some cases, each robotic disassembly agent maintains its own independent history of disassembly sequences. Additionally, or alternatively, past disassembly sequences may be stored in another suitable location—e.g., at an oversight controller communicatively coupled with each of the plurality of robotic disassembly agents.

In some examples, disassembly sequence generation is performed at least partially by a machine learning model (e.g., a "sequence generation model") that learns over time the disassembly sequences that more often result in success for a particular device type. In other words, the disassembly sequence may be generated by a machine learning sequence generation model previously trained based on a plurality of training examples to output disassembly sequences in response to suitable input data. In some examples, based on a determination that a disassembly sequence resulted in successful disassembly of an electronic device, the sequence generation model receives positive feedback that encourages use of similar disassembly sequences in the future. Similarly, upon job failure, the sequence generation model may receive negative feedback that discourages use of similar disassembly sequences.

Figure 5:
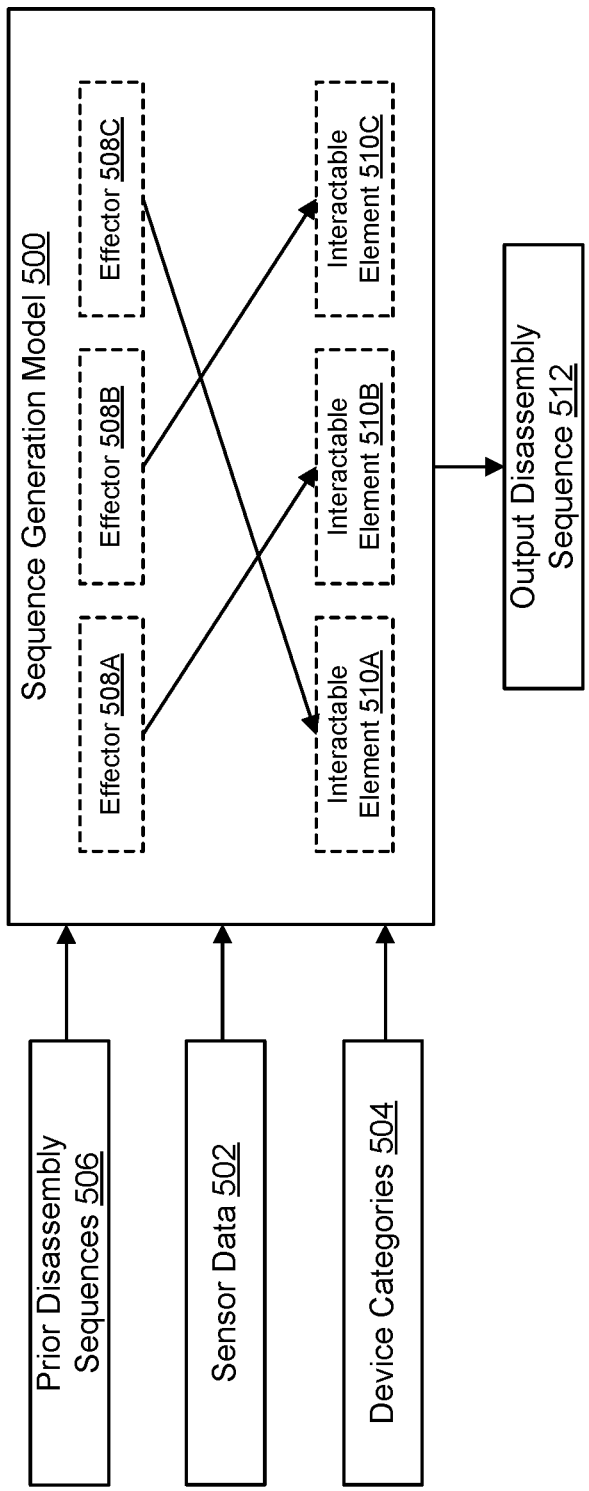
FIG. 5 schematically illustrates identifying correspondences between effectors of a computerized demanufacturing system and interactable elements of a target electronic device.

Disassembly sequence generation is schematically illustrated with respect to FIG. 5. Specifically, FIG. 5 schematically shows an example machine learning sequence generation model 500. As shown, model 500 receives various types of input information, including sensor data 502 collected for the target electronic device, categories 504 that were applied to the target electronic device, and a history of prior disassembly sequences 506 used by the same and/or other robotic disassembly agents. Based on the input information, model 500 identifies correspondences between effectors 508A-C of the robotic disassembly agent and interactable elements 510A-C of the target electronic device. The model outputs a disassembly sequence 512 specifying a series of one or more steps, in which effectors are used to manipulate interactable elements to attempt to disassemble the target electronic device.

When disassembling an electronic device for which a prior recorded disassembly sequence exists, robotic disassembly agents are in some examples configured to iterate on the prior disassembly sequence in an attempt to discover potential refinements. In other words, the disassembly sequence is in some cases a current disassembly sequence generated by iterating on a prior disassembly sequence previously used to successfully disassemble an earlier electronic device that was similarly categorized—e.g., sharing one or more device categories in common with the target electronic device. This may include, for instance, changing the order of one or more disassembly steps in the current disassembly sequence, and/or omitting one or more disassembly steps in the current disassembly sequence, relative to the prior disassembly sequence.

As will be described in more detail below, sequence generation in some examples is done based at least in part on a probability distribution for different candidate actions, and based on rewards calculated for each candidate action. This can contribute to discovery of new disassembly sequences that are more efficient—e.g., by achieving the job goal in less overall time and/or in fewer overall steps.

Additionally, or alternatively, this can increase the efficacy of the computerized manufacturing system at handling specific device types for which it has not explicitly been trained. For example, a hard drive manufacturer may produce an updated hard drive model that is similar to, but has various internal differences from, a known hard drive model that the computerized demanufacturing system has experience disassembling. Through disassembly sequence iteration as described herein, the computerized demanufacturing system is in some cases capable of successfully disassembling the updated hard drive model with little to no direction from a human operator, by a form of transfer learning using existing successful disassembly sequences from similar models.

In other words, while following a prior disassembly sequence, a robotic disassembly agent may, prior to at least one step, make a determination as to whether that step should be completed, or omitted, or delayed to later in the sequence. In one example scenario, a prior disassembly sequence for disassembling a hard drive calls for removal of several screws in a specific order. However, during later execution of the disassembly sequence, the robotic disassembly agent may attempt to omit removal of one or more of the screws and determine whether a next sub-goal can still be completed. In this manner, the agent may discover that, for example, a magnet inside of the hard drive can be removed even if not all screws inside the hard drive are first removed, or discover that the order of screw removal is not critical—e.g., the screws can be removed in an arbitrary order, or screw removal can occur later in the disassembly sequence, while still successfully achieving the sub-goal.

Figure 6:
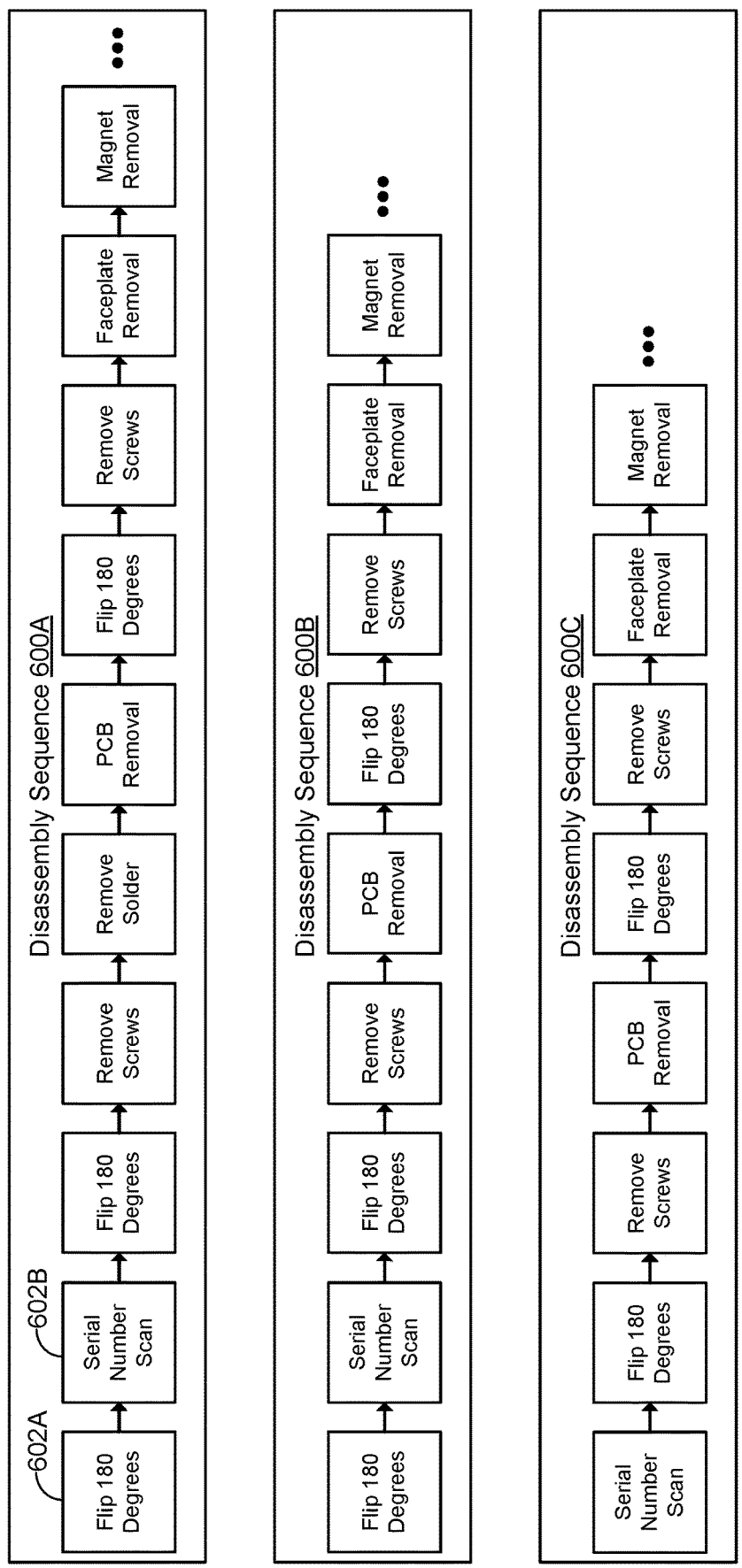
FIG. 6 schematically illustrates iteration of disassembly sequences.

FIG. 6 illustrates examples of disassembly sequence iteration as described above. Specifically, FIG. 6 illustrates three different disassembly sequences, including sequences 600A, 600B, and 600C. As shown, each disassembly sequence includes a series of disassembly steps, two of which are labeled as disassembly steps 602A and 602B. In this example, disassembly sequence 600A is an initial disassembly sequence defined for a particular device type—e.g., a disassembly sequence created by a human operator to disassemble a specific type of hard drive. Sequence 600B represents an iteration of sequence 600A, in which one step (e.g., the "remove solder" step) is omitted. Sequence 600C represents another iteration, in which the initial "flip 180 degrees" step is also omitted.

This can be described as learning a "policy" for each device type, where each policy includes an action probability distribution. The action probability distribution may be used choose the next best action in the disassembly sequence from a set of candidate actions, based on back propagation from each goal in the job, and based on the total discounted rewards for that sequence of actions to achieve the goal.

To help determine and improve the policy and action probability distribution, after each action, the agent may calculate a reward resulting from the action. The sequence of rewards may be summed with a configurable future discount. In some examples, rewards are calculated the same way as the bidding cost, broken down by each action—e.g., based on the weighted sum of time, energy, and maintenance parameters:

Time: The time it takes to complete the action, including the time to setup to perform that action including tool change or orientation from its prior state.

Energy: The energy cost to perform the action

Maintenance: The cost of wear resulting from performing the action including an estimated amortized cost of replacement parts, downtime, and labor costs of the action.

In some examples, the actual values for the time and energy parameters are recorded as the actions are completed, and considered while iterating future disassembly sequences. Values for the maintenance parameter are in some cases learned over time as parts are replaced, and back propagated to the actions associated with the maintenance of each part.

In any case, upon receiving a target electronic device, the robotic disassembly agent attempts to execute a disassembly sequence. Returning briefly to FIG. 2, at 208, method 200 includes automatically manipulating the one or more interactable elements of the target electronic device using the one or more effectors of the computerized demanufacturing system to at least partially disassemble the target electronic device. In this manner, the robotic disassembly agent may achieve one or more goals specified by a disassembly job assigned to the agent. In some examples, the robotic disassembly agent is configured to detect whether the overall disassembly job is successful, and/or whether any sub-goals of the disassembly job are successful—e.g., via a machine learning model trained to recognize components of the electronic device that have been successfully disassembled. If it is determined that any particular goal is not achieved, the failure may be recorded, and additional actions may be taken in an attempt to achieve the goal.

In situations where a goal is not achieved, the agent may perform additional actions aimed at achieving the goal, or at least coming close to achieving the goal. In some examples, this may be limited by a configurable number of attempts to achieve a failed goal (e.g., only so many discrete actions may be attempted after detecting a failure state), and/or limited by a configurable maximum time and/or cost that can be expended after detecting the failure state. In cases where one or more goals cannot be completed given the above constraints, the overall disassembly job may be recorded as a failure, and telemetry related to the job may be stored for future training. Such telemetry may, for instance, serve as negative feedback for a machine learning model that iterates disassembly sequences, thereby discouraging use of similar sequences in the future.

One non-limiting example scenario will now be described, in which a robotic disassembly agent demanufactures a hard drive. First, a target electronic device is classified as a 3.5" hard drive, and a disassembly job is created. The successful end goal state for the job is defined as removal of the data platters and neodymium magnets for a maximum cost less than $0.50, and for a maximum time of less than 60 seconds. The job includes an ordered sequence of sub-goals including PCB removal, lid removal, top magnet removal, armature removal, and bottom magnet removal.

A coordinator agent scans an asset tag on the hard drive, places the drive into a puck, and associates an RFID tag of the puck with a serial number of the drive. The puck is then placed on a conveyor belt (e.g., via a robotic arm of the coordinator), which moves the puck toward the agent assigned to which the disassembly job is assigned. The agent, in anticipation of accepting the drive, configures itself for an initial state by equipping a gripper tool and opening a vice that will be used to hold the drive during disassembly. Analysis of images from the job may also inform a tool change to a likely screwdriver bit as it waits for the hard drive.

The agent determines in some manner that the hard drive has arrived for disassembly. In various examples, the agent is notified of the hard drive's presence by a controller of the conveyor system, by the coordinator agent, and/or the agent detects presence of the hard drive via detection of the puck's RFID tag. In any case, the agent performs a move action to remove the puck from the conveyor belt and place it at a weigh station. The agent then performs a weigh action to confirm that the weight of the device and puck is consistent with the job criteria. The tare weight is in some cases specified by the puck's RFID tag. Images are captured from several camera angles using a moveable camera affixed to a robotic arm.

The agent identifies any plates visible on surfaces of the hard drive based on the captured images. Processing of these images confirms proper classification of the hard drive, and further refines the analysis of fasteners such as fastener condition. It determines the z height, valid tool bit selection options, and fastener angular rotation for each screw. For example, fastener #1 has a specific x, y, z coordinates relative to the plate representing the hard drive lid. It is a Torx #6 or 3 mm drill bit with a face 1 mm above the surface of the plate at an angular rotation of 6 degrees. In this manner, along with reviewing historical experiences matching this pattern, the agent identifies a lid having an approximate center of mass at a detected coordinate. The agent determines that there are no obstructions at the center of mass, so the center of mass coordinate will be used for future drive movement. Pneumatic rotary clamps are extended to a position configured for devices having a 3.5" form factor. The suction tool is then affixed to the surface of the lid to move the drive from the puck to the rotary clamp, and the clamp is closed to secure the drive. As the hard drive is raised, computer vision is used to calculate the angles of the lid relative to the puck's surface, and is used as feedback to refine future suction attach points as the center of mass is learned over time. In some cases, the drive would be lowered, and the suction point would be repositioned and attempted again until the lid is sufficiently parallel to the puck.

The agent determines that the next ordered sub-goal defined by the job includes removal of the drive's PCB. To this end, the agent rotates the drive while capturing images using the overhead mounted camera until the PCB is detected, and then the drive is rotated such that the PCB is in a flat horizontal plane facing up. The agent detects any visible fasteners and calculates a fastener pattern. The agent then checks whether this same fastener pattern has been encountered previously, and if so, loads possible unscrewing sequences that have previously been successful for the observed fastener pattern with their associated success percentage and average cost. In this example, several unique prior unscrewing sequences are available. The agent also randomly generates its own sequence. A weighted random selection of the list of sequences based on success percentage and cost is chosen and the steps in the sequence may be randomly modified. For example, the generated unscrewing sequence may be a randomly modified version of the prior unscrewing sequence, in which the order of the sequence steps is changed, and/or one or more steps are omitted.

Based on the generated unscrewing sequence, the agent attempts to remove the detected fasteners. Upon detecting that a screw is stuck to the toolhead (e.g., via a trained computer vision system), then the agent may perform a "remove from toolhead" action—e.g., using a gripper tool, magnet tool, or other suitable tool. Upon detecting that a particular screw is not turning, the agent attempts to determine whether the screw is stripped, and/or if the bit size is incorrect. Screw stripping may in some cases be detected via computer vision, as one example. The agent may attempt to replace the tool bit with a larger bit or a different type of bit to determine whether this allows the screw to be turned and removed. In this example, fastener removal continues until all detected fasteners are removed.

Next, the agent attempts to remove the PCB using suction. In this example, the PCB is not successfully removed, so the agent searches historical data for any additional removal actions associated with this device type and/or detected fastener pattern. Additionally, or alternatively, sensor data may be collected and interpreted (e.g., via a trained machine learning model) to detect any additional interactable elements that may be preventing goal completion. In this manner, the agent detects a solder connection potentially preventing PCB removal, and performs a desolder operation to remove the solder connection. The agent then makes another attempt to remove the PCB, which is successful, and the removed PCB is placed in the puck. If there is prior history used for the sequence, the history may specify that additional screws are present, including screws that are not directly visible to the computer vision system. As such, similar actions may also be performed to remove the 'hidden' screws revealed after the PCB was removed.

The next sub-goal includes removal of the hard drive's lid. Upon determining that no further actions can be performed with the hard drive's current orientation, the agent rotates the hard drive and identifies that the lid plate is still affixed using additional screws. Upon removing the visible screws, the agent attempts to remove the lid using suction. In this example, the lid is not successfully removed using suction after multiple attempts. The agent next attempts to remove the lid using a pry action, which is successful. Suction is then used to transfer the removed lid to the puck, satisfying the sub goal. The suction action includes additional telemetry as to how successful it was at determining the best coordinate to use. Ideally, the component would not tilt when lifted by suction. The coordinate for single suction cup lid removal may be the same as the coordinate for suction attachment when moving the entire hard drive.

The next sub-goal includes removal of the hard drive's neodymium magnets. The agent changes its equipped tool to the gripper tool, which is used to remove a top magnet and place the top magnet in the puck. The bottom magnet is occluded by an armature, which is first removed using the gripper. The bottom magnet is then removed using the suction tool.

The final sub-goal includes data platter removal. The agent detects a platter and uses the suction tool to remove the platter and place it in the puck. This is repeated several times for each of five platters in the hard drive. The count of platters is defined in the bill of materials (BOM) for this category of drive. The platter count distribution is updated based on observing five platters. Regardless of BOM platter count, computer vision is used to identify and remove all platters. Once all platters are removed, the agent determines that all success goals have been met. The agent rotates the drive, causing any loose screws to fall onto the conveyor system. Small parts including screws are then pushed into a collection bin, which is emptied into the puck. Any other remaining parts, including the drive body, are added to the puck. The weight of the puck is then measured and compared to the input weight. If the ending weight is consistent with the initial weight to within a z-score threshold for its category, then it passes the security policy for weight. Additionally, a computer vision inspection is performed to ensure that all components are as expected. If no issues are found and all goals are completed, then the job is classified as a success. Any and all telemetry and logs associated with this job may be uploaded to a secure cloud location along with a video recording of the session to be analyzed by the oversight controller.

As discussed above, output materials from a successful, partial, or unsuccessful disassembly sequence may be handled in any suitable way. This generally includes sorting, packaging, and/or destroying the disassembled materials output from each job. One non-limiting example scenario will now be described. Specifically, upon successful completion of a job, a robotic disassembly agent places the puck holding the disassembled components back on the conveyor belt. The agent signals to the coordinator agent that the job is completed and the puck has been placed on the conveyor.

The conveyor belt moves the puck toward a robotic pick-and-place system. This system identifies each of the components within the puck, and based upon the job criteria, sorts the components into different locations. Data platters are output for destruction to preserve data privacy, and thus are placed on a secondary conveyor belt leading toward a shredder. The puck itself is returned to the coordinator for reuse in future disassembly jobs.

As discussed above, in some examples, robotic disassembly agents are configured to report disassembly telemetry data to an oversight controller of the computerized demanufacturing system, during or after disassembly of electronic devices. The oversight controller may then aggregate the disassembly telemetry data from different robotic disassembly agents, and distribute the aggregated telemetry data to the various robotic disassembly agents. In some examples, future disassembly of electronic devices is influenced by the aggregated disassembly telemetry data. For example, the aggregated disassembly telemetry data may include updates to network weight and/or bias values that change the behavior of a sequence generation model run by a particular disassembly agent. The updated behavior of the model may incorporate information learned by other robotic disassembly agents—e.g., faster and/or more efficient disassembly sequences.

In general, a robotic disassembly agent, after completion of a job, may send disassembly telemetry to the oversight controller. In some examples, the oversight controller maintains telemetry data transmitted from each of the plurality of robotic disassembly agents. This may include sensor data collected during the disassembly job, the specific disassembly sequence used in the disassembly job, and/or any other suitable information. In some examples, the cost of each job is calculated by the oversight controller, and averaged for each device class. In some examples, the oversight controller further calculates the cost of each individual disassembly action in the disassembly sequence, and may weight relatively more recent actions higher than older sessions—e.g., using an exponential decay function, or a sliding window.

The oversight controller may, in some cases, use the collected telemetry data to predict the next likely state of any given disassembly job after any given action. In this manner, the oversight controller may, for example, determine that attempting to remove the lid of a particular type of hard drive using suction is relatively unlikely to be successful, while attempts to remove the lid using a pry tool are more likely to be successful. In some examples, the probability distribution of different actions for a given state is updated by back propagating the average rewards (costs) found during previous sessions.

Such information may be aggregated over time and distributed to the plurality of robotic disassembly agents. Since agents may have different capabilities, the entire action and state space is in some examples provided to each agent. Agents may then ignore any policy areas that are not applicable.

Collection and distribution of disassembly telemetry data is schematically illustrated with respect to FIGS. 7A and 7B. FIG. 7A schematically shows several robotic disassembly agents 700A-C each transmitting disassembly telemetry data 702A-C to an oversight coordinator 704. In FIG. 7B, the oversight controller transmits aggregated disassembly telemetry data 706 back to the robotic disassembly agents.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 8:
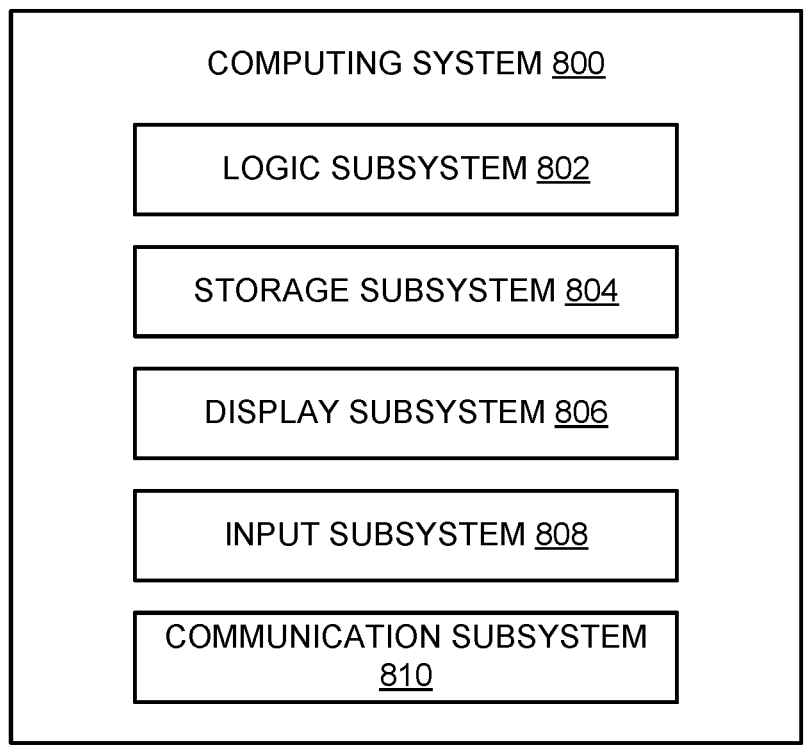
FIG. 8 schematically shows an example computing system.

FIG. 8 schematically shows a simplified representation of a computing system 800 configured to provide any to all of the compute functionality described herein. Computing system 800 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IOT) devices, embedded computing devices, and/or other computing devices.

Computing system 800 includes a logic subsystem 802 and a storage subsystem 804. Computing system 800 may optionally include a display subsystem 806, input subsystem 808, communication subsystem 810, and/or other subsystems not shown in FIG. 8.

Logic subsystem 802 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 804 includes one or more physical devices configured to temporarily and/or permanently hold computer information such as data and instructions executable by the logic subsystem. When the storage subsystem includes two or more devices, the devices may be collocated and/or remotely located. Storage subsystem 804 may include volatile, nonvolatile, dynamic, static, read/write, read-only, random-access, sequential-access, location-addressable, file-addressable, and/or content-addressable devices. Storage subsystem 804 may include removable and/or built-in devices. When the logic subsystem executes instructions, the state of storage subsystem 804 may be transformed—e.g., to hold different data.

Aspects of logic subsystem 802 and storage subsystem 804 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 806 may be used to present a visual representation of data held by storage subsystem 804. This visual representation may take the form of a graphical user interface (GUI). Display subsystem 806 may include one or more display devices utilizing virtually any type of technology. In some implementations, display subsystem may include one or more virtual-, augmented-, or mixed reality displays.

When included, input subsystem 808 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 810 may be configured to communicatively couple computing system 800 with one or more other computing devices. Communication subsystem 810 may include wired and/or wireless communication devices compatible with one or more different communication protocols. The communication subsystem may be configured for communication via personal-, local- and/or wide-area networks.

ML and/or AI components may be designed to provide context as to how they operate, so that implementers of ML and/or AI systems can be accountable for decisions/assessments made by the systems. For example, ML and/or AI systems may be configured for replicable behavior, e.g., when they make pseudo-random decisions, random seeds may be used and recorded to enable replicating the decisions later. As another example, data used for training and/or testing ML and/or AI systems may be curated and maintained to facilitate future investigation of the behavior of the ML and/or AI systems with regard to the data. Furthermore, ML and/or AI systems may be continually monitored to identify potential bias, errors, and/or unintended outcomes.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method for automated device disassembly comprises: at a computerized demanufacturing system, receiving a target electronic device for disassembly; using one or more sensors of the computerized demanufacturing system, collecting a set of sensor data quantifying one or more physical properties of the target electronic device; based at last in part on the set of sensor data, identifying correspondences between one or more effectors of the computerized demanufacturing system and one or more interactable elements of the target electronic device; and automatically manipulating the one or more interactable elements of the target electronic device using the one or more effectors of the computerized demanufacturing system to at least partially disassemble the target electronic device. In this example or any other example, the computerized demanufacturing system includes two or more robotic disassembly agents, and wherein the one or more sensors and the one or more effectors are distributed between the two or more robotic disassembly agents. In this example or any other example, a robotic disassembly agent of the two or more robotic disassembly agents includes different types of effectors, configured to perform different types of functions, from other robotic disassembly agents of the two or more robotic disassembly agents. In this example or any other example, a robotic coordinator agent of the computerized demanufacturing system generates a disassembly job for the target electronic device based at least in part on the set of sensor data, receives a bid from a robotic disassembly agent of the two or more robotic disassembly agents expressing a confidence of successful job completion for the disassembly job, and selects the robotic disassembly agent as a selected robotic disassembly agent to carry out the disassembly job based at least in part on the bid. In this example or any other example, the disassembly job specifies a successful end goal state and a maximum job cost, and wherein the confidence of successful job completion is estimated by the selected robotic disassembly agent based at least in part on the successful end goal state, the maximum job cost, and a history of prior job completion by the selected robotic disassembly agent. In this example or any other example, the robotic coordinator agent receives bids from two or more different robotic disassembly agents including the selected robotic disassembly agent, calculates suitability parameters for each bid, and assigns the disassembly job to the selected robotic disassembly agent based at least in part on a corresponding suitability parameter calculated for the selected robotic disassembly agent. In this example or any other example, the robotic coordinator agent assigns the disassembly job to the selected robotic disassembly agent based at least in part on a role identity of the selected robotic disassembly agent. In this example or any other example, the two or more robotic disassembly agents are configured to, during disassembly of electronic devices, report disassembly telemetry data to an oversight controller of the computerized demanufacturing system. In this example or any other example, the oversight controller is configured to aggregate the disassembly telemetry data from the two or more robotic disassembly agents, and distribute aggregated disassembly telemetry data to the two or more robotic disassembly agents, and wherein future disassembly of electronic devices by the two or more robotic disassembly agents is influenced by the aggregated disassembly telemetry data. In this example or any other example, the one or more effectors include robotic arms of the two or more robotic disassembly agents, and wherein the robotic arms are configured to perform different disassembly functions using different tools. In this example or any other example, identifying correspondences between the one or more effectors and the one or more interactable elements includes generating a disassembly sequence of one or more disassembly steps, and wherein each disassembly step specifies an operation to be performed by a specified effector of the one or more effectors. In this example or any other example, the method further comprises, based at least in part on the set of sensor data, applying one or more device categories to the target electronic device, and wherein the disassembly sequence is generated based at least in part on a prior disassembly sequence used to successfully disassemble a prior electronic device categorized with the same one or more device categories. In this example or any other example, the disassembly sequence is a current disassembly sequence generated by iterating on the prior disassembly sequence, such that at least one disassembly step of the prior disassembly sequence is omitted or reordered in the current disassembly sequence. In this example or any other example, the current disassembly sequence is generated by a previously-trained, machine learning sequence generation model, and wherein the previously-trained machine learning sequence generation model receives positive feedback based at least in part on a determination that the target electronic device was successfully disassembled by following the current disassembly sequence. In this example or any other example, the one or more device categories are applied to the target electronic device by a machine learning device categorization model previously trained to categorize electronic devices based on input sensor data. In this example or any other example, applying the one or more device categories includes performing a preliminary categorization based on the set of sensor data, and upon determining that a confidence of the preliminary categorization is less than a confidence threshold, performing a supplemental categorization based on a supplemental set of sensor data collected using the one or more sensors of the computerized demanufacturing system. In this example or any other example, the supplemental set of sensor data includes one or more sensor data types not used for the preliminary classification. In this example or any other example, the target electronic device is a hard disk drive (HDD).

In an example, a robotic disassembly agent comprises: one or more effectors usable to perform disassembly operations; and a controller configured to: receive a set of sensor data quantifying one or more physical properties of a target electronic device for disassembly by the robotic disassembly agent; based at least in part on the set of sensor data, generate a disassembly sequence of one or more disassembly steps, each disassembly step specifying a disassembly operation to be performed by an effector of the one or more effectors on an interactable element of the target electronic device; and execute the disassembly sequence to at least partially disassemble the target electronic device.

In an example, a method for automated device disassembly comprises: at a computerized demanufacturing system including a plurality of robotic disassembly agents, receiving a target electronic device for disassembly; using one or more sensors of the computerized demanufacturing system, collecting a set of sensor data quantifying one or more physical properties of the target electronic device; based at last in part on the set of sensor data, at a robotic disassembly agent of the plurality of robotic disassembly agents, generating a disassembly sequence of one or more disassembly steps, each disassembly step specifying a disassembly operation to be performed by an effector of the robotic disassembly agent on an interactable element of the target electronic device; at the robotic disassembly agent, executing the disassembly sequence to at least partially disassemble the target electronic device; at the robotic disassembly agent, transmitting disassembly telemetry data to an oversight controller of the computerized demanufacturing system, the disassembly telemetry data relating to disassembly of the target electronic device; at the oversight controller of the computerized demanufacturing system, aggregating the disassembly telemetry data received from the robotic disassembly agent with disassembly telemetry data received from other robotic disassembly agents of the plurality of robotic disassembly agents as aggregated disassembly telemetry data; and distributing the aggregated disassembly telemetry to the plurality of robotic disassembly agents, wherein future disassembly of electronic devices by the plurality of robotic disassembly agents is influenced by the aggregated disassembly telemetry data.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for automated device disassembly, comprising:
    at a computerized demanufacturing system, receiving a target electronic device for disassembly;
    using one or more sensors of the computerized demanufacturing system, collecting a set of sensor data quantifying one or more physical properties of the target electronic device;
    based at last in part on the set of sensor data, identifying correspondences between one or more effectors of the computerized demanufacturing system and one or more interactable elements of the target electronic device; and
    automatically manipulating the one or more interactable elements of the target electronic device using the one or more effectors of the computerized demanufacturing system to at least partially disassemble the target electronic device through a disassembly sequence of one or more disassembly steps, wherein the disassembly sequence is generated based at least in part on the sensor data and a prior disassembly sequence used to successfully disassemble a prior electronic device, and wherein the prior electronic device shares a common device category with the target electronic device.

2. The method of claim 1, wherein the computerized demanufacturing system includes two or more robotic disassembly agents, and wherein the one or more sensors and the one or more effectors are distributed between the two or more robotic disassembly agents.

3. The method of claim 2, wherein a robotic disassembly agent of the two or more robotic disassembly agents includes different types of effectors, configured to perform different types of functions, from other robotic disassembly agents of the two or more robotic disassembly agents.

4. The method of claim 2, wherein a robotic coordinator agent of the computerized demanufacturing system generates a disassembly job for the target electronic device based at least in part on the set of sensor data, receives a bid from a robotic disassembly agent of the two or more robotic disassembly agents expressing a confidence of successful job completion for the disassembly job, and selects the robotic disassembly agent as a selected robotic disassembly agent to carry out the disassembly job based at least in part on the bid.

5. The method of claim 4, wherein the disassembly job specifies a successful end goal state and a maximum job cost, and wherein the confidence of successful job completion is estimated by the selected robotic disassembly agent based at least in part on the successful end goal state, the maximum job cost, and a history of prior job completion by the selected robotic disassembly agent.

6. The method of claim 4, wherein the robotic coordinator agent receives bids from two or more different robotic disassembly agents including the selected robotic disassembly agent, calculates suitability parameters for each bid, and assigns the disassembly job to the selected robotic disassembly agent based at least in part on a corresponding suitability parameter calculated for the selected robotic disassembly agent.

7. The method of claim 4, wherein the robotic coordinator agent assigns the disassembly job to the selected robotic disassembly agent based at least in part on a role identity of the selected robotic disassembly agent.

8. The method of claim 2, wherein the two or more robotic disassembly agents are configured to, during disassembly of electronic devices, report disassembly telemetry data to an oversight controller of the computerized demanufacturing system.

9. The method of claim 8, wherein the oversight controller is configured to aggregate the disassembly telemetry data from the two or more robotic disassembly agents, and distribute aggregated disassembly telemetry data to the two or more robotic disassembly agents, and wherein future disassembly of electronic devices by the two or more robotic disassembly agents is influenced by the aggregated disassembly telemetry data.

10. The method of claim 1, wherein the one or more effectors include robotic arms of the two or more robotic disassembly agents, and wherein the robotic arms are configured to perform different disassembly functions using different tools.

11. The method of claim 1, wherein each disassembly step of the disassembly sequence specifies an operation to be performed by a specified effector of the one or more effectors.

12. The method of claim 11, further comprising, based at least in part on the set of sensor data, applying one or more device categories to the target electronic device.

13. The method of claim 12, wherein the disassembly sequence is a current disassembly sequence generated by iterating on the prior disassembly sequence, such that at least one disassembly step of the prior disassembly sequence is omitted or reordered in the current disassembly sequence.

14. The method of claim 13, wherein the current disassembly sequence is generated by a previously-trained, machine learning sequence generation model, and wherein the previously-trained machine learning sequence generation model receives positive feedback based at least in part on a determination that the target electronic device was successfully disassembled by following the current disassembly sequence.

15. The method of claim 12, wherein the one or more device categories are applied to the target electronic device by a machine learning device categorization model previously trained to categorize electronic devices based on input sensor data.

16. The method of claim 12, wherein applying the one or more device categories includes performing a preliminary categorization based on the set of sensor data, and upon determining that a confidence of the preliminary categorization is less than a confidence threshold, performing a supplemental categorization based on a supplemental set of sensor data collected using the one or more sensors of the computerized demanufacturing system.

17. The method of claim 16, wherein the supplemental set of sensor data includes one or more sensor data types not used for the preliminary classification.

18. The method of claim 1, wherein the target electronic device is a hard disk drive (HDD).

19. A robotic disassembly agent, comprising:
one or more effectors usable to perform disassembly operations; and
a controller configured to:
based on a disassembly job generated by a robotic coordinator agent, generate a bid expressing a confidence of successful completion for disassembly of a target electronic device, wherein the disassembly job is generated based on a set of sensor data collected using one or more sensors, and wherein one or more other robotic disassembly agents also generate bids in response to the disassembly job;
responsive to acceptance of the bid by the robotic coordinator agent, receive a set of sensor data quantifying one or more physical properties of the target electronic device for disassembly by the robotic disassembly agent;
based at least in part on the set of sensor data, generate a disassembly sequence of one or more disassembly steps, each disassembly step specifying a disassembly operation to be performed by an effector of the one or more effectors on an interactable element of the target electronic device; and
execute the disassembly sequence to at least partially disassemble the target electronic device.

20. A method for automated device disassembly, comprising:
at a computerized demanufacturing system including a plurality of robotic disassembly agents, receiving a target electronic device for disassembly;
using one or more sensors of the computerized demanufacturing system, collecting a set of sensor data quantifying one or more physical properties of the target electronic device;
based at last in part on the set of sensor data, at a robotic disassembly agent of the plurality of robotic disassembly agents, generating a disassembly sequence of one or more disassembly steps, each disassembly step specifying a disassembly operation to be performed by an effector of the robotic disassembly agent on an interactable element of the target electronic device;
at the robotic disassembly agent, executing the disassembly sequence to at least partially disassemble the target electronic device;
at the robotic disassembly agent, transmitting disassembly telemetry data to an oversight controller of the computerized demanufacturing system, the disassembly telemetry data relating to disassembly of the target electronic device;
at the oversight controller of the computerized demanufacturing system, aggregating the disassembly telemetry data received from the robotic disassembly agent with disassembly telemetry data received from other robotic disassembly agents of the plurality of robotic disassembly agents as aggregated disassembly telemetry data; and
distributing the aggregated disassembly telemetry to the plurality of robotic disassembly agents, wherein future disassembly of electronic devices by the plurality of robotic disassembly agents is influenced by the aggregated disassembly telemetry data.

\* \* \* \* \*